July 7, 1942.  E. R. WEISBENDER  2,288,970
COMESTIBLES
Filed Sept. 7, 1940
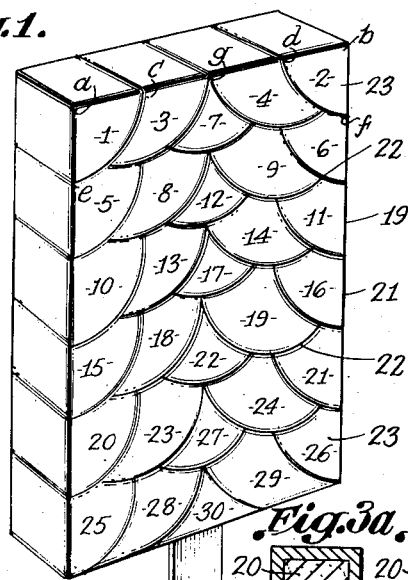
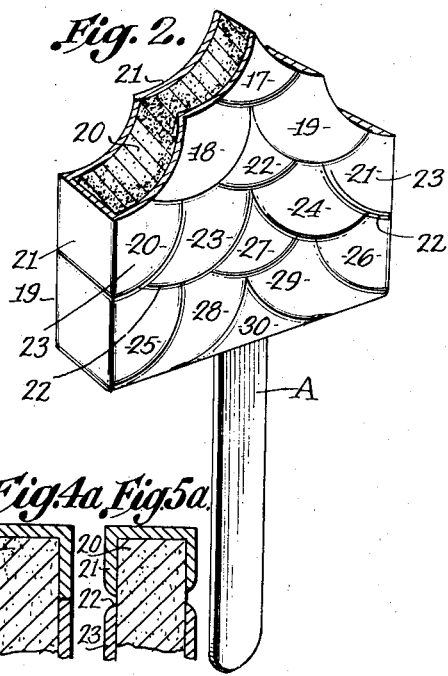
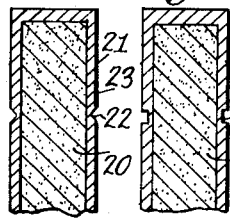
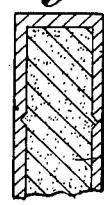
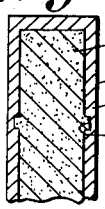
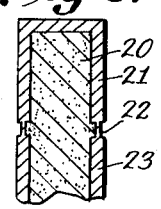
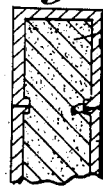
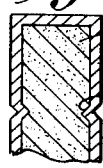
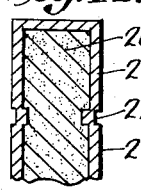
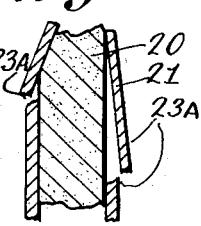
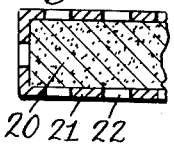
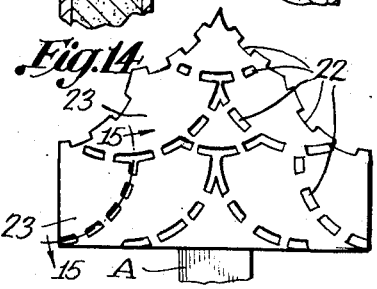
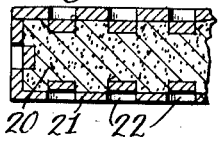
INVENTOR.
Eugene R. Weisbender Patented July 7, 1942

2,288,970

UNITED STATES PATENT OFFICE 2,288,970

COMESTIBLE

Eugene R. Weisbender, Manhattan, Kans.

Application September 7, 1940, Serial No. 355,713

7 Claims. (Cl. 99—137)

(Granted under the act of March 3, 1883, as amended April 30, 1928; 370 O. G. 757)

Food products are known of the type comprising a relatively soft or frozen inner body of ice cream or the like, encased in a coating of enrobing chocolate or other edible composition. Such coated ice cream bars and like confections, because of the comparatively poor bond between the body and the coating, particularly as the temperature of the body rises, in the case of ice cream, above the softening point thereof, coupled with the comparative brittleness and frangibility of the coating, present the inconvenience that the coating tends, during consumption of the bar, to undergo extensive splitting and shelling off when a section is being severed from the bar as by the bite of the consumer. This shelling off of the coating, as is well known, results in the soiling of the person and garments of the consumer; in the unsanitary dripping of softened or liquefied portions of the embraced inner body; and detracts generally from the convenient and sanitary character of the confection.

From a hygienic and sanitary standpoint it has heretofore been deemed a very important feature to not alone coat or encase the body portion of the food stuff but to provide associated means for the convenient and sanitary handling of the article. In the exercise and provision of such precautionary means and methods of sanitation, however, little or no progress has been made in the provision of a coating, or other surrounding wall for the body portion, in the way of preventing its being cracked, broken, or pried loose from the body portion, by and surrounding the bite of the consumer during the eating thereof, resulting in the falling or dropping of soiling and unsanitary sections of the coating and consequent exposure of the side walls of the body portion, which, in the case of ice cream and the like, subjects the exposed body portion to liquefying temperatures which bring about leakage or drippage.

Efforts have heretofore been made, however, to obviate these difficulties by attempting to increase the bond between the inner body and the outer coating; but such attempts have met with little, if any, success, and in addition so complicated the process of manufacture as to add materially to the cost of the product.

The present invention relates to confections of the above type and aims generally to improve the same. Thus, the present invention aims to effectively solve the above mentioned problems by controlling and limiting the cracking and spalling off of the coating to predetermined areas as the same are severed from the product. In connection with the general object, the invention further aims to enhance the attractiveness of the product and to facilitate convenient and sanitary, as well as induce, edibility of the confection.

Further and other objects of the invention will be apparent from the following detailed description of preferred embodiments of the same and from features of the invention illustrated in the accompanying drawing in which—

Figure 1 is a perspective view of an exemplary article of the class described, whereon there is diagrammatically indicated one arrangement of patterning, positioning or locating lines of demarcation, fracture, indentation, scoring, separation, perforation, or of weak resistance, in the coating of the article;

Figure 2, a perspective view illustrating the centrally apexed formation of a partially consumed article of the character of Figure 1;

Figures 3, 3a, 4, 4a, 5, 5a, and 6 through 12, fragmentary cross sections of a coated article, exemplifying formations of the aforesaid lines;

Figure 13, a fragmentary cross section of an article of a present exploited type illustrating the faults and habits thereof intended to be overcome by the present invention;

Figure 14, an elevational view comparable with that of Figure 2, except for its illustration of a modified form of line formation;

Figure 15, a fragmentary cross-section taken at line 15—15 of Figure 14; and

Figure 16, a fragmentary cross section comparable with that of Figure 15 but illustrative of a modified line formation.

The embodiment selected for illustration, generally indicated by character reference 19, somewhat resembles the shape of the present exploited "Good Humor" but may be of any desired shape or size and preferably, though not necessarily, of a thickness whereby it may be mannerly and easily passed into the mouth, and between the teeth of the consumer. The article is of a character which is comprised of a quantity or quantities of one or more food stuff of a consistency which becomes or is normally soft or fluid at temperatures above the freezing point of the particular substance. Food stuff of the character described is molded, frozen, or otherwise formed into a body, bar or heart portion 20 and thereafter or simultaneously provided with an edible protective wall, shell, coating or the like 21. Or, if deemed preferable or more expeditious, the body portion 20 may be formed within a preformed coating or the like 21, or may be inserted into a preformed coating or the like 21 after formation, or the coating may be otherwise encasingly, surroundingly, coatingly, or containingly associated with the body portion 20.

The body portion 20 is usually, though not necessarily, of an edible substance or food stuff differing from that of the coating 21. The coating or the like 21 need not necessarily be but is preferably of a flavor pleasing to the taste and of a substance or consistency which is or becomes substantially liquid impervious, thermoplastic, hard, tough, stiffened, non-sticky, brittle, frozen or coagulated when subjected to affecting temperatures, elements or substances. A most satisfactory substance for the coating, and which is most generally employed for articles of the character, is chocolate, chocolate mixtures or chocolate mixtures or chocolate flavored substances. Bonded or embedded granules of edible substances may also be suitably employed as a coating.

The present invention aims to effectively improve such combinations as just described in connection with character references 19, 20 and 21 by the provision of means or formations in the coating and/or body whereby to facilitate the severance of portions of the combined product, for shearing, dividing or consuming the same, without destroying the coating or its intended effect on the divided or remaining portion of the product. Such improved means or formations may comprise lines or zones of demarcation, fracture, indentation, perforation, scoring, separation or other means or formations in or on the coating 21 and/or body portion 21 as indicated by character reference 22. In some instances illustrated, the line formations 22 provide, define, or at least partially surround areas or sections 23 of predetermined size and shape which may be more readily severed along their bounding line formations than through or across the areas 23 themselves.

The line formations 22 are preferably complementarily patterned on opposite faces of the article, but may be slightly offset, if found desirable, to correspond substantially with the normal offset of the upper and lower teeth of the consumer. Also, the complementary lines of the opposite sides of a more or less flat article of the character described may be connected by a continuation of the same or other line formations across the edges or remaining faces of the article. There is thereby provided a coating which is continuous, or substantially continuous, yet readily severable at predetermined boundary lines.

The pattern of the lines 22 is preferably, but not necessarily, of a design which circumscribes, defines or at least partially bounds surface areas, each of which may be comparable with a normally sized bite, and the circumscribed areas may be of a crescent, rectangular, elliptical, or of any other desired or practical design or shape. A most practical design or shape of the areas defined or bounded by the line formations 22 is illustrated in Figures 1, 2 and 14, and by reference to those figures it will be seen that the areas so defined are of a rounded, elliptical, or oval base formation comparable with the shape of the normal bite. In this patterning, the base curves of the bite areas successively circumscribe a prominent, foremost or outward point of the article. To define more specifically, the areas 23 are numbered successively from 1 through 30 in an order of successive prominence. By reference to the most prominent and foremost areas numbered 1 and 2, it will be seen that their base curves circumscribe the foremost corners $a$ and $b$ of the particular article shown for illustrative purposes, while the base curves of areas 3 and 4 circumscribe the most prominent points $c$ and $d$ after areas 1 and 2 are removed. With the removal or consumption of areas 1, 2, 3 and 4, the areas next in prominence, and which are most likely to drip or drop liquefied portions or particles, are 5 and 6 and whose base curves circumscribe the next most prominent outer points $e$ and $f$. With the consumption of these prominent and most easily obtained bites, the article becomes centrally apexed (see Figures 2 and 14). The shape or formation thus created gives a maximum sloping area over which particles or liquefied portions must roll or run before reaching a brink from which to fall or drip. In order to continue the reformations of a central apex, the pointed central area 7, most prominently exposed and whose base curve circumscribes a central point $g$, should next be consumed. With the consumption of that area the order or progression aforesaid may be repeated, in the numerical order indicated, to reform a central apex. Aside from functional utility, the successive numbering of the areas may prove of such novelty as to persuasively induce the edibility of the article, and persuasively suggest the size of bite to be taken, especially for children who are more or less inclined to take abnormally sized bites to the detriment of their health and digestion.

By the pattern just described in connection with Figures 1, 2 and 14, it will be seen that each successively numbered area is prominently exposed, whereby it may be readily and conveniently passed into the mouth for severance at the base curve thereof without danger of bringing the remainder of the article soilingly into contact with the consumer's face. Within the scope of my invention, patterning of this character may consist of a greater or lesser number of areas than illustrated and the base curves may circumscribe points other than defined by way of example.

The line formations 22 are preferably visibly indicated on the exterior surface of the member 21 but may be formed so that their existence is invisible from an exterior observation. A number of exemplary line constructions or formations 22 are shown in the fragmentary cross sections of Figures 3, 3a, 4, 4a, 5, 5a, 6 through 12, 15, 16, and in elevation in Figure 14. These lines, of the character defined, may be formed in the original molding of the article or may be subsequently formed by compression, scoring, grooving, or other methods. They may be also formed by the application of separate sections 23 of the coating 21 to the body portion 20, or by superimposing thicknesses of the coating within the boundary lines of the areas 23. As shown in Figures 5 through 12 and 16, lines 22 of the aforesaid character may be also formed by the provision or formation of ridges or projections, or grooves or indentations on or in the side walls of the body portion 20, rather than residing solely in the coating 21 as illustrated in Figures 3, 3a, 4, 4a, 5a, and 15.

Without affecting the plane of the body 20, the line formations 22 of Figures 3, 4, and 15 may be provided in the coating 21 by molding, scoring or otherwise reducing, removing or eliminating at least a portion of the coating to weaken the coating at line 22 over that of the adjacent areas of the coating. As shown in Figures 5 and 6, the body 20 may be formed with portions projecting beyond the plane thereof, and the coating 21 formed with a uniform exterior plane, whereby the thickness of the coating over the projections of the body 20 is of less thickness than the adjacent portions of the coating. In Figures 7 and 8, it will be seen that the formations of Figures 3 and 4, and 5 and 6 may be combined. It is also within the scope of my invention to provide such lines of severance by completely or intermittently severing the coating as in Figures 3a and 4a, but not necessarily separating the severed areas from abutting relation. If desired, however, the areas 23 may be wholly, partially or intermittently separated as in Figure 5a. In such formation as that of Figure 5a, the article may be made even more attractive by varying the colors of the adjacent areas. Likewise, the character and color of the body 20, which may be seen at the lines of separation, may enhance the appearance of the product.

Reference is next made to the line formations illustrated in Figures 11, 12 and 16. In these instances the body may be provided with grooves or indentations in the molding thereof and the coating allowed to follow the configuration of the surface of the body 20, or as illustrated by the same figures, the body 20 may be formed with a flat surface and the coating 21, also of a uniform thickness, may be pressed into the body 20 to thereby create not alone a line of demarcation but a line of fracture in the coating. By return reference to Figures 3 and 4, it will be seen that lines of fracture may be created by compressing the coating against a body portion 20 of sufficient rigidity as to set up a counter force to the compression of the coating. If not of such rigidity the compressed lines of the coating will be forced into the body 20 as intended also to be shown in Figures 11, 12 and 16.

As illustrated in Figure 14, the lines 22 may comprise intermittent recesses, as more clearly seen in Figure 15, or be formed by intermittently forcing portions of the coating wholly or partially into the body 20, as seen in Figure 16, or compressing those portions against the body 20, as in Figures 3 and 4, or again by the formation of intermittent projections or recesses in the body portion 20. Formations of these characters may give the novel exterior appearance of teeth marks.

The line formations thus far referred to have resided primarily in the coating 21, to create lines of severance or of weak resistance in the coating, to facilitate biting through the coating at predetermined lines without crushing or destroying the intended effect of the coating surrounding the bite or its relationship to the body portion. It is, however, also within the scope of my invention to provide lines of weak resistance in the body portion 20 of the article, as in Figure 10, or in both the coating 21 and the body 20, as in Figures 9, 11 and 12. In Figure 10 the body portion 20 may be formed or provided with grooves or indentations and the coating, while it may be thicker at such lines, may be more readily broken at 23′ between such thickened lines than through adjacent areas due to the weaker breaking line of the body 20 and the anchoring effect of the adjacent lines of thickened coating. The thickened coating portion of the Figure 9 construction may be cut or scored, as shown, in order that the coating also may be provided with a line of weak resistance.

It is to be understood that I do not limit my invention to the particular means or formations shown and described for the provision of lines of severance or weak resistance. Those shown and described are only illustrative of some forms by which my invention may be practiced. I am aware, however, of coatings which extend completely through the body portion or completely surround small portions of the article, such as in the provision of a plurality of adhering capsules, and make no claim thereto.

Within the scope of my invention the combined improved article may or may not be provided with means for the convenient and sanitary handling thereof by the manufacturer, the dealer, and the consumer and whereby the product may be eaten by the consumer without the need of a spoon or dish. To the latter end, the article may be provided with a handle member 24 or other grasping means, which may or may not be of edible material, attached to the article or supporting or containing the same in some appropriate or desired manner. Such handling means may also be of a surrounding or penetrating character or may be associated with the coated article by extending into the same. Means of the latter character may be secured to the article by such as congelation, concretion, or other bonding or securing means and methods.

Figure 13 is intended to illustrate, in a fragmentary cross section, the faults of the present exploited type of coated food stuff. From experience it is known that by biting across such unimproved articles, the coatings along the line of the bite are forced toward each other, rather than readily severed, with the result that the coatings extending from the line of bite are broken by the bending stresses and pried loose. Such loosened coating sections 23A are thereafter free to fall since their bond with the body as well as with the remainder of the coating has been destroyed. With my improved article, the coating may be readily severed along a predetermined line by the bite of the consumer or cutting instrument without subjecting the adjacent areas to bending stress or destroying the coating beyond areas ordinarily circumscribed by the normal bite.

The invention described herein, if patented, may be manufactured and used by or for the Government of the United States for governmental purposes without the payment to me of any royalty thereon.

What I claim is:

1. A coated frozen confection of the type in which the coating during consumption receives little mechanical support from the coated body portion and therefore tends to undergo extended splitting and shelling off when the product is bitten, said confection being formed with a plurality of lines of fracture in the coating, the arrangement of the lines being such as will tend to limit the splitting and shelling off of the coating to substantially the area to be removed by individual bites.

2. A comestible including a frozen body portion formed of a substance which is fluid at normal temperatures and congeals by refrigeration, and an outer protective covering bonded to the body portion and formed of a substantially liquid impervious substance which is comparatively hard at normal temperatures and relatively brittle at sub-freezing temperatures, said outer protective covering having structurally weakened zones along which the covering is more readily fracturable than across adjacent areas of the covering, said weakened zones being arranged so as to define areas at least one of which may be included in each normal bite or mouthful, whereby areas defined by said zones may be severed without fracture to adjacent areas or destruction to the bond between said adjacent areas and the body portion therebeneath.

3. A confection including a body consisting of a frozen edible substance which is fluid at normal temperatures and a shell-like coating of edible substance bonded to said body in which said coating is provided with lines of weak resistance arranged to define areas of a size as may be embraced in a normal bite and along which lines said coating and body portion therebeneath may be severed without seriously destroying the bond between the remaining coating and body portion.

4. A coated ice cream product of the type comprising a body having a coating apt to shell off in uncontrolled split sections under the strain of severance of a part of the coated body from the remainder in which said coating is provided with a multiplicity of lines along which the coating is weakened to suggest and define portions thereof comparable in size with a normal bite of the product and tending to obviate uncontrolled shelling off of the coating beyond the confines of the weakened lines.

5. A comestible in accordance with claim 2, in which said structurally weakened zones are arcuately positioned to mark off the product into sections having a shape and size comparable with a normal bite.

6. A comestible in accordance with claim 3, in which said lines of weak resistance comprise arcuately arranged intermittently weakened zones resembling the marks of human teeth suggesting individual and successive bites.

7. A frozen confection including a handle, a body formed of ice cream, a substantially liquid impervious coating on said body formed of a thermoplastic edible substance, said coated body being carried by said handle, and fracture checking formations along said coating arranged so that at least one of the fracture checking formations will be closely adjacent any individual bite, whereby breakage of a portion of the coating by any individual bite will be limited in its fracture a predetermined distance from said bite.

EUGENE R. WEISBENDER.

Patent No. 2,288,970                                         Granted July 7, 1942

EUGENE R. WEISBENDER

The above entitled patent was extended October 2, 1951, under the provisions of the Act of June 30, 1950, for 5 years and 189 days from the expiration of the original term thereof.

*Commissioner of Patents.*